(12) United States Patent
Mech et al.

(10) Patent No.: US 11,488,356 B2
(45) Date of Patent: Nov. 1, 2022

(54) DEFORMATION WITH META-HANDLES OF 3D MESHES

(71) Applicant: ADOBE INC., San Jose, CA (US)

(72) Inventors: Radomir Mech, Mountain View, CA (US); Minhyuk Sung, Cupertino, CA (US); Minghua Liu, La Jolla, CA (US)

(73) Assignee: ADOBE INC., San Jose, CA (US)

( * ) Notice: Subject to any disclaimer, the term of this patent is extended or adjusted under 35 U.S.C. 154(b) by 38 days.

(21) Appl. No.: 17/195,099

(22) Filed: Mar. 8, 2021

(65) Prior Publication Data

US 2022/0284677 A1 Sep. 8, 2022

(51) Int. Cl.
*G06T 11/60* (2006.01)
*G06T 17/20* (2006.01)
*G06N 3/04* (2006.01)

(52) U.S. Cl.
CPC .......... *G06T 17/20* (2013.01); *G06N 3/0472* (2013.01)

(58) Field of Classification Search
None
See application file for complete search history.

(56) References Cited

U.S. PATENT DOCUMENTS

| | | | | |
|---|---|---|---|---|
| 7,982,732 B2 * | 7/2011 | Olhofer | ................... | G06T 17/30 345/646 |
| 10,410,317 B1 * | 9/2019 | Phogat | ................... | G06T 3/0068 |
| 10,909,746 B1 * | 2/2021 | Kantar | ................... | G06N 3/0454 |
| 2019/0197771 A1 * | 6/2019 | Batra | ................... | G06T 11/00 |
| 2021/0335026 A1 * | 10/2021 | Phogat | ................... | G06T 11/203 |

OTHER PUBLICATIONS

Zhu, Lifeng, et al. "Diffusion-based non-uniform regularization for variational shape deformation." Computer-Aided Design 81 (2016): 61-69.*
Mo, K., Guerrero, P., Yi, L., Su, H., Wonka, P., Mitra, N., & Guibas, L. J. (2019). Structurenet: Hierarchical graph networks for 3d shape generation. arXiv preprint arXiv:1908.00575.
Ovsjanikov, M., Li, W., Guibas, L., & Mitra, N. J. (2011). Exploration of continuous variability in collections of 3D shapes. ACM Transactions on Graphics (TOG), 30(4), 1-10.
Fish, N., Averkiou, M., Van Kaick, O., Sorkine-Hornung, O., Cohen-Or, D., & Mitra, N. J. (2014). Meta-representation of shape families. ACM Transactions on Graphics (TOG), 33(4), 1-11.

(Continued)

*Primary Examiner* — Sultana M Zalalee
(74) *Attorney, Agent, or Firm* — Shook, Hardy & Bacon LLP

(57) ABSTRACT

This disclosure includes technologies for deformation of 3D shapes using meta-handles. The disclosed 3D conditional generative system takes control points with biharmonic coordinates as deformation handles for a shape to train a network to learn a set of meta-handles for the shape. Further, each deformation axis of the latent space of deformation is explicitly associated with a meta-handle from a set of disentangled meta-handles, and the disentangled meta-handles factorize plausible deformations of the shape. Advantageously, an intuitive deformation of the shape may be generated by manipulating coefficients of the meta-handles, e.g., via a user interface.

20 Claims, 9 Drawing Sheets

(56) References Cited

OTHER PUBLICATIONS

Gao, L., Yang, J., Wu, T., Yuan, Y. J., Fu, H., Lai, Y. K., & Zhang, H. (2019). SDM-NET: Deep generative network for structured deformable mesh. ACM Transactions on Graphics (TOG), 38(6), 1-15.

Wang, W., Ceylan, D., Mech, R., & Neumann, U. (2019). 3dn: 3d deformation network. In Proceedings of the IEEE Conference on Computer Vision and Pattern Recognition (pp. 1038-1046).

Sung, M., Jiang, Z., Achlioptas, P., Mitra, N. J., & Guibas, L. J. (2020). DeformSyncNet: Deformation Transfer via Synchronized Shape Deformation Spaces. arXiv preprint arXiv:2009.01456.

Yifan, W., Aigerman, N., Kim, V. G., Chaudhuri, S., & Sorkine-Hornung, O. (2020). Neural Cages for Detail-Preserving 3D Deformations. In Proceedings of the IEEE/CVF Conference on Computer Vision and Pattern Recognition (pp. 75-83).

Hao, Z., Averbuch-Elor, H., Snavely, N., & Belongie, S. (2020). DualSDF: Semantic Shape Manipulation using a Two-Level Representation. In Proceedings of the IEEE/CVF Conference on Computer Vision and Pattern Recognition (pp. 7631-7641).

Gadelha, M., Gori, G., Ceylan, D., Mech, R., Carr, N., Boubekeur, T., . . . & Maji, S. (2020). Learning Generative Models of Shape Handles. In Proceedings of the IEEE/CVF Conference on Computer Vision and Pattern Recognition (pp. 402-411).

Wang, Y., Jacobson, A., Barbič, J., & Kavan, L. (2015). Linear subspace design for real-time shape deformation. ACM Transactions on Graphics (TOG), 34(4), 1-11.

\* cited by examiner

DEFORMATION WITH META-HANDLES OF 3D MESHES

BACKGROUND

In three-dimensional (3D) computer graphics, 3D modeling is the process of developing a mathematical representation of a surface of a 3D object. 3D models have a wide variety of applications, e.g., in the medical industry, scientific researches, the engineering industry, the motion picture industry, the video game industry, the architecture industry, etc.

Many 3D models represent a 3D object with points connected by various geometric entities such as triangles, lines, curved surfaces, etc. For example, shell models, which represent the object's boundary instead of its volume, are widely used. Many shell models are built as textured polygonal models because they are flexible, and computers can render them quickly. Polygonal modeling with polygonal meshes is generally considered the most common 3D modeling approach. A polygon mesh is a collection of vertices, edges, and faces that define a polyhedral object's shape.

New polygonal meshes can be formed from scratch or by deforming existing polygon meshes. Generating a brand new mesh typically consumes high computing resources (e.g., CPU/GPU and memory) and requires precise mesh quality controls, which makes it impractical for some applications (e.g., video games). In contrast, the mesh deformation option is more practical and flexible. However, many conventional mesh deformation methods are difficult to use and often produce implausible deformations (e.g., after destroying the structural properties of the 3D object, such as symmetry).

SUMMARY

This Summary is provided to introduce selected concepts that are further described below in the Detailed Description. This Summary is not intended to identify key features or essential features of the claimed subject matter, nor is it intended to be used as an aid in determining the scope of the claimed subject matter.

In general, this disclosure includes a 3D conditional generative model for mesh deformation. From a collection of 3D meshes of a category and their deformation handles, the disclosed system learns a set of disentangled meta-handles for each shape, represented as combinations of the given deformation handles. The disentangled meta-handles factorize plausible deformations of a shape and correspond to respective intuitive deformations in the respective axis, which may be further represented visually in a graphical user interface (GUI) to facilitate user-friendly intuitive deformation.

The deformation function uses meta-handles for a given 3D shape and their corresponding coefficients to generate a new deformation of the 3D shape. In some embodiments, the disclosed system determines the coefficient of one or more meta-handles from the set of meta-handles based on one or more user-controllable parameters and a coefficient range of each meta-handle.

In various embodiments, the disclosed system applies a fitting regularization, a geometric regularization, an adversarial regularization, and/or a disentanglement regularization during training to learn the meta-handles and their coefficient ranges. Further, in various embodiments, the disclosed system employs biharmonic coordinates in the deformation function to smoothly propagate the control points' translations to the entire mesh. Resultantly, the generated deformations demonstrate many superior properties.

In summary, various systems, methods, and computer-readable storage devices are disclosed to improve a computing system's functions for 3D modeling. The overarching technical purpose is to deform a 3D mesh. Among many aspects of technical characteristics described herein to achieve the aforementioned technical purpose, the disclosed system determines a set of meta-handles from the control points of a 3D mesh and the coefficient range of each meta-handle that corresponds to plausible deformation based on a fitting regularization, a geometric regularization, an adversarial regularization, and/or a disentanglement regularization. In this way, the disclosed system factorizes the deformation space with a small number of disentangled meta-handles, each of which provides an intuitive deformation by leveraging the correlations between the control points.

Resultantly, these technical characteristics lead to further technical effects, including controlling the deformation process, e.g., by enabling users to make intuitive, controllable, and plausible deformations of a 3D mesh based on a set of meta-handles for the 3D mesh. Various other improvements over conventional systems are further discussed in the Detailed Description below.

BRIEF DESCRIPTION OF THE DRAWINGS

The technologies described herein are illustrated by way of example and not limited by the accompanying figures in which like reference numerals indicate similar elements and in which.

DETAILED DESCRIPTION

Figure 1:
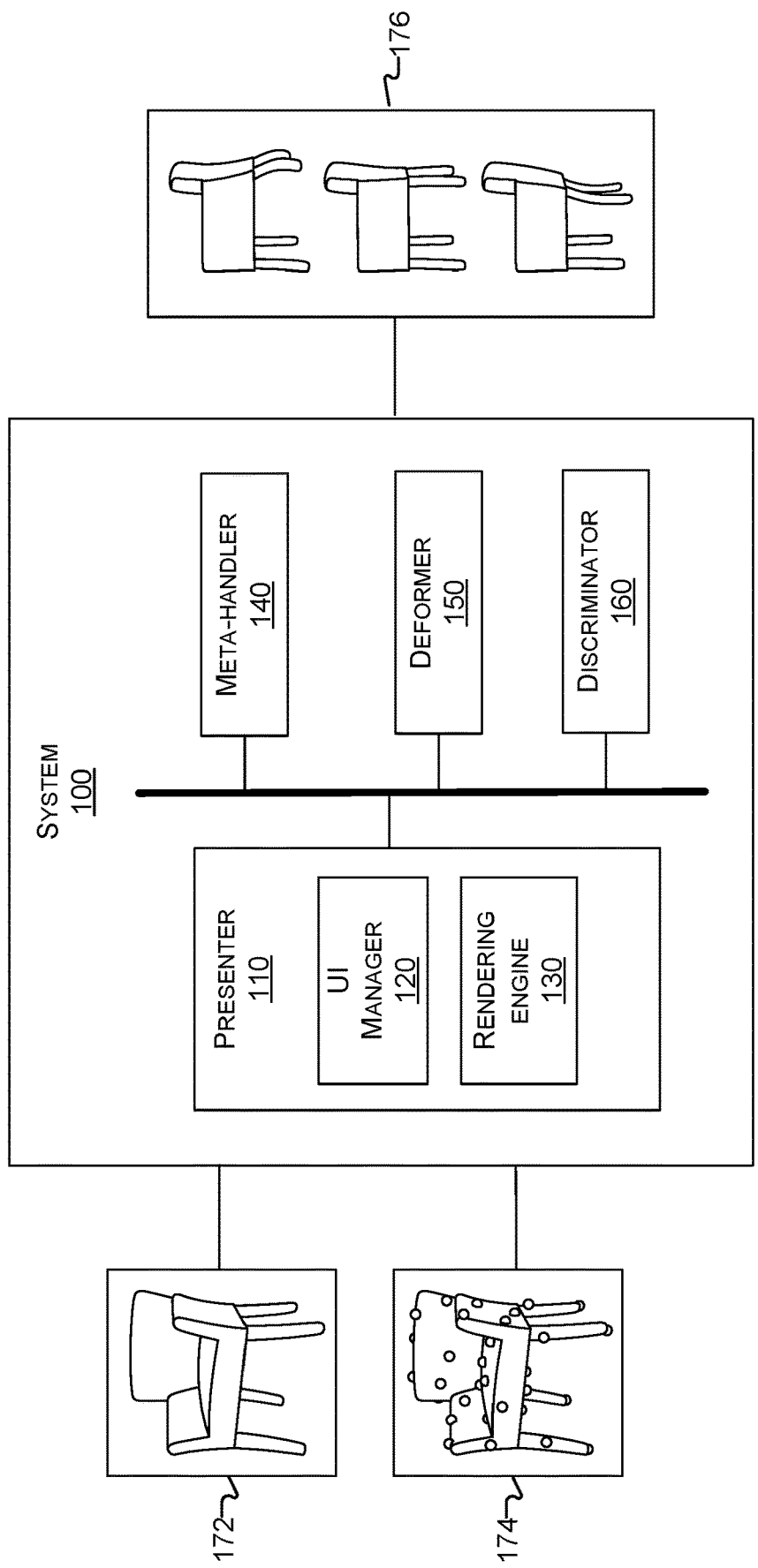
FIG. 1 is a schematic representation in a first-level illustrating an exemplary deformation system, in accordance with at least one aspect of the technologies described herein.

The various technologies described herein are set forth with sufficient specificity to meet statutory requirements.

However, the description itself is not intended to limit the scope of this disclosure. Instead, the inventors have contemplated that the claimed subject matter might also be embodied in other ways, to include different steps or combinations of steps similar to the ones described in this document, in conjunction with other present or future technologies. Moreover, although the terms "step" or "block" may be used herein to connote different elements of methods employed, the terms should not be interpreted as implying any particular order among or between various steps herein disclosed unless and except when the order of individual steps is explicitly described. Further, the term "based on" generally denotes that the succedent object, data, or information is used in performing the precedent action.

3D meshes (also referred to herein as "meshes," "shapes," or "3D shapes") can store sharp edges and smooth surfaces compactly. However, learning to generate 3D meshes is much more challenging than 2D images due to the irregularity of mesh data structures and the difficulty in designing loss functions to measure geometrical and topological properties. To create new meshes, instead of generating a mesh from scratch, it is generally more efficient to deform an existing mesh with known connectivity structure of geometries, such as by changing the geometry without altering the connectivity structure.

Generating meshes is very challenging, in particular, when preventing the generation of non-manifold faces or disconnected components, which lead to distortion. Due to this and other challenges, many conventional mesh deformation methods often produce implausible deformations (e.g., after destroying the structural properties of the 3D object, such as symmetry) and are difficult to use, among many other limitations.

The disclosed system and methods are configured to overcome those limitations. For example, many conventional approaches can generate shapes by deforming a given template mesh. However, the scope of the generation is limited to the possible variations of the template mesh. In contrast, the disclosed system overcomes such limitations with a 3D conditional generative model, which can take any existing mesh as input and produce its plausible variants.

As another example, one conventional approach parameterizes the deformation as new positions of all the mesh vertices. However, such a large degree of freedom often results in the loss of fine-grained geometric details and tends to cause undesirable distortions. In contrast, the disclosed 3D conditional generative model prevents implausible deformations by improving the plausibility of the output shapes and enhancing the interpretability of the learned latent space for deformation.

As yet another example, conventional approaches are generally very difficult to control and use. In contrast, the disclosed system provides a novel mechanism to enable users to make intuitive, controllable, and plausible deformations based on meta-handles and their corresponding deformation directions. Advantageously, the disclosed system improves the plausibility of the output shapes and enhances the interpretability of the learned latent spaces.

In some embodiments, the disclosed system takes random pairs of source and target shapes as input during training. For the source shape, the control points are sampled from its mesh vertices by farthest point sampling, and the biharmonic coordinates for control point handles are computed. The disclosed system includes two main networks (or nets): meta-handle net and deformation net. The meta-handle net first predicts a set of meta-handles for the source shape, where each meta-handle is represented as a combination of control point offsets. A deformation range is also predicted for each meta-handle, providing a range of coefficients describing the scope of plausible deformations along the direction of deformation for each meta-handle. The learned meta-handles, together with the corresponding ranges, define a deformation subspace for the source shape. The deformation net predicts coefficients multiplied to the meta-handles within the predicted ranges so that the source shape deformed with the coefficients can match the target shape. Further, the system randomly samples coefficients within the predicted ranges and applies both geometric and adversarial regularizations to the corresponding deformations to ensure the plausibility of variations within the learned subspace.

In contrast to typical generative models, where shape variations are embedded into a latent space implicitly, the disclosed system explicitly factorizes all the plausible deformations of a shape with a small number of interpretable deformation functions. Specifically, for each axis of the input-dependent latent space, a deformation function is defined with the given set of control points and offset vectors on them so that each axis can correspond to an intuitive deformation direction. These deformation axes are represented by meta-handles as each axis is explicitly linked to multiple control point handles. Further, the disclosed system is configured to learn disentangled meta-handles, in the sense that a meta-handle should not only leverage the correlations of the control point handles but also correspond to a group of parts that tend to deform altogether according to the dataset. In this way, the disclosed system can use the disentangled meta-handles to deform each part group independently in downstream applications.

Beyond choosing the parameterization of deformations, the disclosed system is further configured to maintain the plausibility of deformations. In an adversarial learning framework, a conventional approach would be converting the output mesh to voxels or point clouds and exploiting voxel or point cloud based discriminators. Such conversions, however, may discard some important geometric details. Differently, the disclosed system projects the shapes into a 2D space with a differentiable soft rasterizer and employs a 2D discriminator. In this way, the disclosed system captures local details of plausible shapes.

Among many others, one technical purpose of the disclosed system is to deform a 3D mesh. Among many aspects of technical characteristics described herein to achieve the aforementioned technical purpose, the disclosed system determines a set of meta-handles from the control points of a 3D mesh and the coefficient range of each meta-handle that corresponds to plausible deformation based on a fitting regularization, a geometric regularization, an adversarial regularization, or a disentanglement regularization. In this way, the disclosed system factorizes the deformation space with a small number of disentangled meta-handles, each of which provides an intuitive deformation by leveraging the correlations between the control points.

Additional technical characteristics include an adversarial regularization provided, in some configurations, by a 2D discriminator. A render is configured to capture, from a randomly sampled view, respective two-dimensional (2D) silhouette images for a deformed 3D shape and the source 3D shape; a 2D discriminator is configured to predict respective probabilities of the respective 2D silhouette images for being deformed; and implausible deformations are penalized based on the respective probabilities. In this way, the disclosed system improves the plausibility of the deformations by exploiting the differentiable renderer and the 2D discriminator.

Resultantly, these technical characteristics lead to further technical effects, including controlling the deformation process, e.g., by presenting user interface elements associated with a set of meta-handles for a 3D shape to enable users to make intuitive, controllable, and plausible deformations to the 3D shape based on the set of meta-handles and the deformation directions associated with each meta-handle. Additional technical effects include producing smooth but flexible deformations with fine-grained geometric details by learning geometric variations of the given shape while preserving its topological structure and local geometric information.

Additionally, the disclosed deformation technologies may be integrated into many existing platforms or solutions and used in various applications in the medical industry, the scientific research, the engineering industry, the motion picture industry, the video game industry, and the architecture industry, etc.

After briefly describing an overview of the technologies described herein, referring now to FIG. 1. A schematic representation of an exemplary deformation system (system 100) is illustrated in FIG. 1. In this embodiment, system 100 includes presenter 110, meta-handler 140, deformer 150, and discriminator 160, among other components. These components in system 100 provide a novel mechanism to enable users to make intuitive, controllable, and plausible deformations based on the visual representations of meta-handles and their corresponding deformation directions via a GUI.

For instance, system 100 determines meta-handles and their corresponding coefficient ranges for the source shape 172 based in part on control-points 174 on the source shape 172 and their biharmonic coordinates. A GUI may provide user interface elements that allow a user to adjust coefficients of the meta-handles and generate various deformed shapes. This process is further discussed in connection with FIG. 2

Presenter 110 is configured to manage the input and output to system 100. In various embodiments, presenter 110 may include user interface (UI) manager 120 to manage different user interfaces and rendering engine 130 to generate 3D shapes from 3D meshes.

To accomplish this deformation process, meta-handler 140 predicts a set of meta-handles for the source shape 172, where each meta-handle is represented as a combination of control-point offsets. Meanwhile, meta-handler 140 estimates a deformation range for each meta-handle. The deformation range for each meta-handle comprises a range of coefficients that corresponds to the scope of plausible deformations along the deformation direction associated with the meta-handle. In this way, the learned meta-handles, together with the corresponding ranges, define a deformation subspace for the source shape. This process is further discussed in connection with FIG. 4

Deformer 150 takes the source shape, a target shape, the predicted meta-handles with their coefficient ranges from the meta-handler 140, and predicts coefficients multiplied to the meta-handles within the predicted ranges so that the source shape deformed with the coefficients can match a target shape during the training. This process is further discussed in connection with FIG. 3.

Discriminator 160 is a 2D discriminator in some embodiments. Discriminator 160 may further contain a render configured to capture, from a randomly sampled view, respective two-dimensional (2D) silhouette images for the source 3D shape with a random deformation and the source 3D shape. Further, discriminator 160 is configured to predict the respective probabilities of the respective 2D silhouette images for being deformed. Implausible deformations may be penalized based on the respective probabilities in the training process.

In various embodiments, meta-handler 140, deformer 150, and/or discriminator 160 uses neural networks to accomplish their respective functions. Various specific neural networks used in system 100 are further discussed in connection with FIG. 3, FIG. 4, and FIG. 5. In general, a neural network may include any number of layers; for the purpose of illustration, a neural network may be described to have at least three operational layers, e.g., an input layer, a hidden layer, and an output layer. Each layer comprises neurons. The input layer neurons pass data to neurons in the hidden layer. Neurons in the hidden layer pass data to neurons in the output layer. The output layer then produces a classification, for example. Different types of layers and networks connect neurons in different ways. The objective of one type of layer (e.g., Convolutional, Relu, and Pool) is to extract features of the input volume, while the objective of another type of layer (e.g., Fully-connected and Softmax) is to classify based on the extracted features.

Neural networks with more than one hidden layer may be called deep neural networks. Examples of neural networks that may be used with aspects of the technology described herein include, but are not limited to, multi-layer perceptron (MLP) networks, convolutional neural networks (CNN), recursive neural networks, recurrent neural networks, and long short-term memory (LSTM) (which is a type of recursive neural network). Some embodiments described herein use a convolutional neural network, but aspects of the technology are applicable to other types of multi-layer machine classification technology.

Some layers may include parameters (e.g., weights or biases), such as a convolutional layer, while others may not, such as the ReLU layers and pooling layers. In various embodiments, the parameters may be learned or updated during training. Further, some of the layers may include additional hyper-parameters (e.g., learning rate, stride, epochs, kernel size, number of filters, type of pooling for pooling layers, etc.), such as a convolutional layer or a pooling layer, while other layers may not, such as a ReLU layer. Various activation functions may be used, including but not limited to, ReLU, leaky ReLU, sigmoid, hyperbolic tangent (tanh), exponential linear unit (ELU), etc. The parameters, hyper-parameters, or activation functions are not limited and may differ depending on the embodiment.

Although input layers, convolutional layers, pooling layers, ReLU layers, and fully connected layers are discussed herein, this is not intended to be limiting. For example, additional or alternative layers, such as normalization layers, softmax layers, or other layer types, may be used in a neural network.

Although some examples are described herein with respect to using neural networks, and specifically convolutional neural networks, this is not intended to be limiting. For example, and without limitation, system 100 may use any type of machine learning models, such as a machine learning model(s) using linear regression, logistic regression, decision trees, support vector machines (SVM), Naïve Bayes, k-nearest neighbor (KNN), K means clustering, random forest, dimensionality reduction algorithms, gradient boosting algorithms, neural networks (e.g., auto-encoders, convolutional, recurrent, perceptrons, long/short term memory/LSTM, Hopfield, Boltzmann, deep belief, deconvolutional, generative adversarial, liquid state machine, etc.), and/or other types of machine learning models.

System 100 is merely one example of a suitable computing environment and is not intended to suggest any limitation on the scope of use or functionality of aspects of the technologies described herein. Neither should this system be interpreted as having any dependency or requirement relating to any one component nor any combination of components illustrated. It should be understood that each of the components shown in system 100 may be implemented on any type of computing device, such as computing device 900 described in FIG. 9. Different components in system 100 may be distributed to different physical devices. Further, a component may communicate with another component or various external devices via a network, which may include, without limitation, a local area network (LAN) or a wide area network (WAN).

It should be understood that this arrangement in system 100 is set forth only as an example. Other arrangements and elements (e.g., machines, networks, interfaces, functions, orders, and grouping of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combinations and locations. Further, various functions described herein as being performed by an entity may be carried out by hardware, firmware, or software. For instance, some functions may be carried out by a processor executing special instructions stored in memory, such as deformation logic 922 of FIG. 9.

Figure 2:
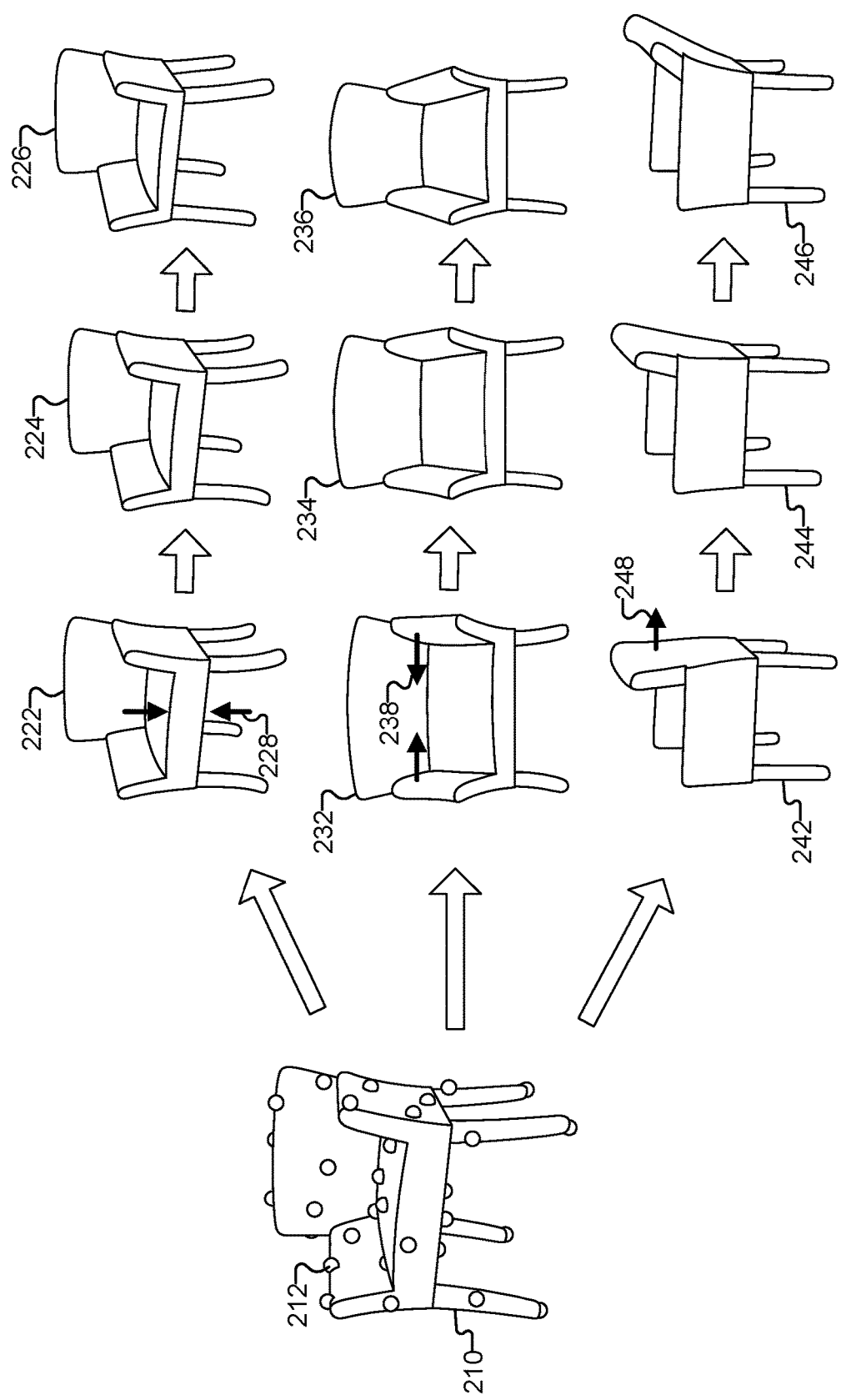
FIG. 2 is a schematic representation illustrating an exemplary process for interacting with an exemplary deformation system via an exemplary user interface, in accordance with at least one aspect of the technologies described herein.

The system 100 provides a 3D conditional generative model that can be used to deform the source shape 172 by adjusting coefficients of learned meta-handles to provide deformed 3D shapes, such as the shapes 176. By way of illustration, FIG. 2 shows the operation of learned meta-handles for a single chair 210 (shown with control-points as dots, such as the control-point 212). Each row in FIG. 2 indicates a different meta-handle and shows three deformations along the direction of that meta-handle, with arrows highlighting the deformed region.

Each learned meta-handle for the chair 210 associates with a type of natural deformation of semantic parts of chair 210 with a deformation direction, such as lifting the arms or bending or tilting the backrest. For example, the meta-handle deformation shown in the second row is associated with controlling the distance between the arms, e.g., in narrowing or widening directions.

In one embodiment, deformations of a 3D shape may be controlled using user interface elements in the user interface for every meta-handle. For instance, a slider could be provided for each meta-handle as a user interface element to control the deformation associated with each meta-handle. User input from the user interface elements may be converted to coefficients for the meta-handles to control the extent of deformation to the 3D shape.

Each sequence in FIG. 2 shows sequential deformations along the direction of a meta-handle. For example, chair 222, chair 224, and chair 226 are the results of manipulation in the deformation direction represented by arrow 228. Resultantly, the seat of the chair becomes thinner and thinner. As another example, chair 232, chair 234, and chair 236 are the results of manipulation in the deformation direction represented by arrow 238. Resultantly, the distance between the armrests becomes narrower and narrower. As yet another example, chair 242, chair 244, and chair 246 are the results of manipulation in the deformation direction represented by arrow 248. Resultantly, the backrest is bent backward with different deformation degrees.

The associated deformation directions of meta-handles may be represented by graphical elements in the user interface. In this way, a user can generate plausible deformed shapes in an intuitive way along the deformation direction. Further, the user can control the magnitude of the deformation by interacting with the user interface. In one embodiment, to keep the deformed shape appears plausible, the deform system translates the speed or distance of the mouse movement to a specific coefficient in the coefficient range of a meta-handle. For instance, faster speed or longer distance would trigger the system to choose a coefficient in one end of the coefficient range, and this chosen coefficient would cause greater deformation. Conversely, slower speed or shorter distance would trigger the system to choose another coefficient at another end of the coefficient range, and that chosen coefficient would cause lesser deformation.

This deformation system achieves this intuitive and controllable deformation by learning intuitive and disentangled meta-handles in an unsupervised fashion, which further factorizes all the plausible deformations for the shape. Further experiments also show that the learned meta-handles and their disentanglement thereof are consistent across various shapes (beyond just the demonstrative chair example, as shown in FIG. 2).

Figure 3:
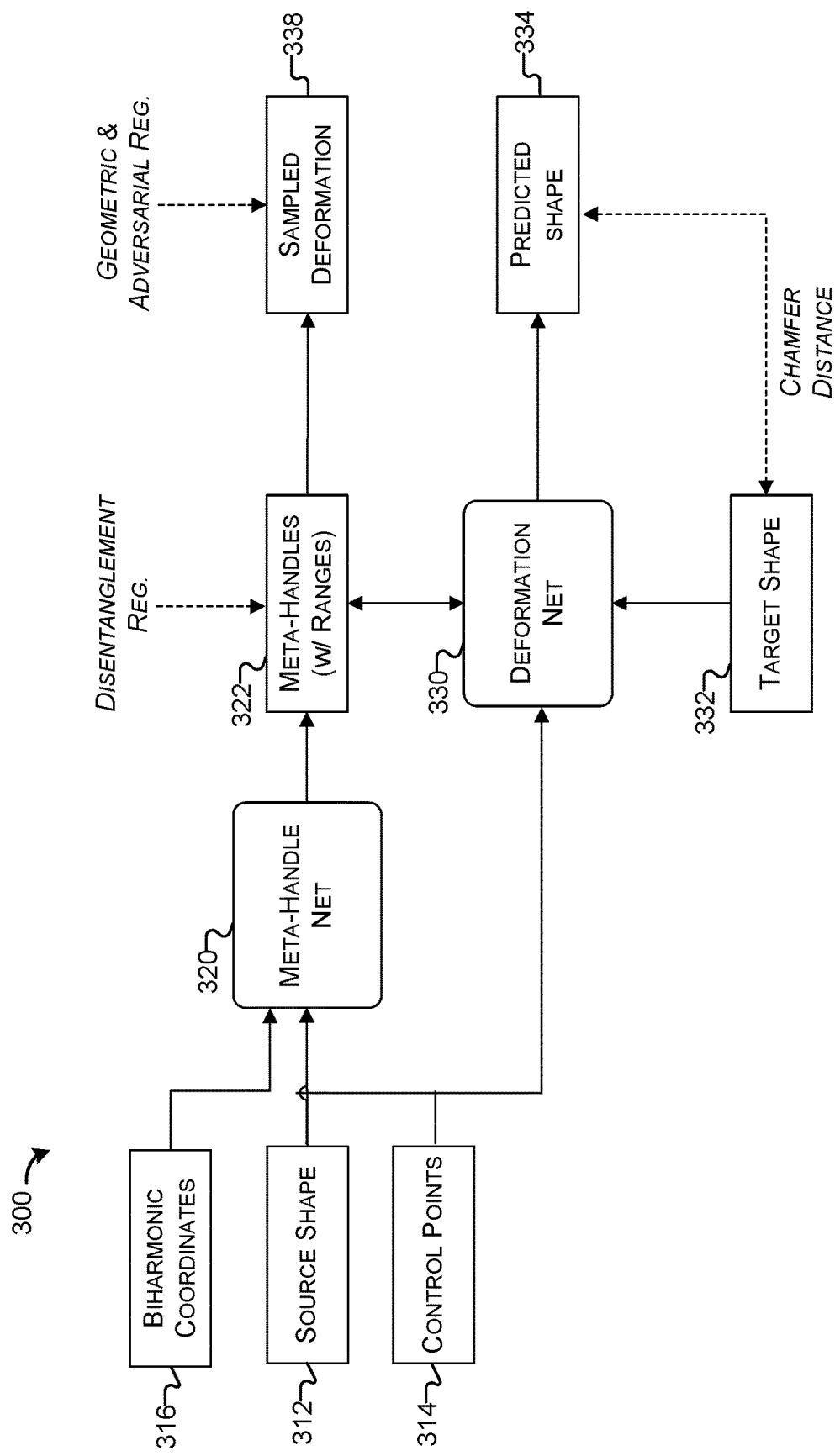
FIG. 3 is a schematic representation in a second-level illustrating an exemplary deformation system, in accordance with at least one aspect of the technologies described herein.

FIG. 3 is a schematic representation in another level, illustrating an exemplary system 300. This figure shows the general architecture of this exemplary system 300. This general architecture is a model designed to learn meta-handles and corresponding coefficient ranges from control points 314 on a 3D mesh of a source shape 312 and the corresponding biharmonic coordinates 316 of the control points 314. The learned meta-handles and their corresponding ranges can then be used to deform the source shape 312. This disclosure will first discuss the control point-based deformation and the biharmonic coordinates technique and how the meta-handles are learned from the control points and biharmonic coordinates in an unsupervised fashion.

At a high level, the system 300 learns meta-handles 322 in an unsupervised fashion without taking semantic annotations or correspondences across the shapes as input or supervision. For example, taking a pair of randomly sampled shapes (i.e., source shape 312 and target shape 332) within the same category as input, the system 300 predicts a deformation space for the source shape 312 and finds a deformation within the space to match the target shape 332. Specifically, meta-handle net 320 takes source shape 312, control points 314, and biharmonic coordinates 316 as input and predicts meta-handles 322 as well as their corresponding coefficient ranges. Deformation net 330 then predicts coefficients of the meta-handles within the coefficient ranges so that a resulting deformation of the source shape 312 (i.e., predicted shape 334) matches the target shape 332.

This system 300 leverages meta-handles and their corresponding coefficient ranges to parameterize a deformation with a low degree of freedom because mesh deformation through directly moving individual vertex is cumbersome and may easily lead to unwanted distortions, as seen in many conventional systems. For a 3D mesh, a vertex refers to a position in 3D space along with other information such as color, normal vector, and texture coordinates. Vertices are connected by edges. Further, a closed set of edges form a face. For example, a triangle face has three edges, and a quad face has four edges. More generally, a polygon is a coplanar set of faces.

In various embodiments, this system 300 employs a subset of mesh vertices as the deformation handles (control points) and restrict the transformations of the handles to pure translations. Specifically, given the mesh vertices $V \in \mathbb{R}^{n \times 3}$ (n vertices) and a set of c control points $C \in \mathbb{R}^{c \times 3}$, the linear map $W \in \mathbb{R}^{n \times c}$ between them (V=WC) is also called "generalized barycentric coordinates." W may be defined based on biharmonic functions or biharmonic coordinates. Here, source shape 312, control points 314, and biharmonic coordinates 316 are utilized by meta-handle net 320 to derive meta-handles 322, which have their respective coefficient ranges to control the degree of freedom for deformation.

In one embodiment, this deformation system samples c control points from the mesh vertices by farthest point sampling (FPS) over the geodesic distances. The biharmonic coordinates W (e.g., 316) may be precomputed. However, the deformation function $f: \mathbb{R}^{c \times 3} \to \mathbb{R}^{n \times 3}$ defined over the given control points C, $f(C)=WC$, has 3c degrees of freedom. It may overparameterize the plausible shape variation space, which means there may be many implausible deformations if the system randomly translates the control points. Also, there may exist strong correlations across the deformations from moving individual control points. To combat these issues, meta-handle net 320 is configured to learn a disengaged meta-handle with a deformation direction as well as a coefficient range to ensure the resulting deformation resides in a lower-dimensional disengaged subspace and can be factorized into several meaningful deformation directions.

Specifically, meta-handle net 320 is configured to learn a smaller number of meta-handles to factorize the subspace covering all the plausible deformations. Specifically, each meta-handle $M_i \in \mathbb{R}^{c \times 3}$ is represented as offsets over the c control points, as in Eq. 1, where $\vec{t}_{ij} \in \mathbb{R}^3$ indicates the offset of the jth control point for the ith meta-handle.

$$M_i = [\vec{t}_{i1}, \dots, \vec{t}_{ic}]^T \tag{Eq. 1}$$

In contrast to a single control point that mainly affects a local region of the mesh, each meta-handle is expected to provide a more intuitive deformation direction, which may correspond to some semantic meanings. In various embodiments, a linear combination of the meta-handles is used to represent a deformation. Specifically, a new deformation function $g: \mathbb{R}^m \to \mathbb{R}^{n \times 3}$ is defined with respect to the meta-handles $\{M_i\}_{i=1 \dots m}$ and their linear combination coefficients $a=[a_1, \cdots, a_m]$, such as shown in FIG. 2.

$$g(a; \{M_i\}_{i=1 \dots m}) = W\left(C_0 + \sum_{i=1}^{m} a_i M_i\right) \tag{Eq. 2}$$

In Eq. 2, in denotes the number of meta-handles or m-dimensional input-dependent latent space. $C_0 \in \mathbb{R}^{c \times 3}$ denotes the rest positions of the given control points. In the context of the conditional generative model, it can be interpreted as that each shape has a m-dimensional input-dependent latent space, where each axis corresponds to a meta-handle describing a specific deformation function in 3D space. A coefficient vector a can thus be directly decoded to a deformation of the input mesh as a linear combination of the meta-handles.

Meta-handle net 320 utilizes a small number of meta-handles to learn a low-dimensional compact deformation space. The degrees of freedom of the deformation function g is typically much smaller than that of the deformation function f, i.e., m<<3c. As a result, the meta-handles are required to not only leverage the correlations of the control point handles but also discover the underlying properties of the shape structure (e.g., chair legs are symmetric and should thus be deformed together). Along with the meta-handles, meta-handle net 320 also predicts ranges of the coefficients $\{[L_i, R_i]\}_{i=1 \dots m}$ associated with each meta-handle. The ranges describe the scope of plausible deformations along the direction of each meta-handle. Any set of coefficients within the ranges $\Pi_{i=0}^{m-1}[L_i, R_i]$ is thus expected to produce a plausible deformation.

Various regularizations (including a chamfer distance, disentanglement regularization, geometric regularization, and adversarial regularization) are used when training the system 300 to achieve a number of objectives, including: 1) to cause the deformed source shape from the deformation net 330 match the given target shape 332; 2) to ensure the plausibility of any deformation sampled from the learned coefficient ranges; 3) to enable the learned meta-handles properly disentangle the deformation space. In various embodiments, the networks of the system 300 are trained with the following joint loss function in Eq. 3.

$$\mathcal{L} = \mathcal{L}_{fit} + \mathcal{L}_{geo} + \mathcal{L}_{adv} + \mathcal{L}_{disen} \tag{Eq. 3}$$

Among the four terms, the fitting loss $\mathcal{L}_{fit}$ corresponds to the first objective and minimizes the Chamfer distance between the deformed source point cloud and the target point cloud. The Chamfer distance measures the similarity of two contours and may be represented as a sum of closest point distances. Further, Chamfer distance between the deformed shape and the target shape is used to measure alignment errors.

$\mathcal{L}_{geo}$ and $\mathcal{L}_{adv}$ are geometric loss and adversarial loss, respectively. They are designed towards the second objective to ensure the plausibility of any deformation sampled from the learned ranges. In each iteration, the training process randomly samples a deformation within the predicted ranges and apply these two losses to penalize implausible deformations. Specifically, $\mathcal{L}_{geo}$ is further decomposed loss terms in Eq. 4.

$$\mathcal{L}_{geo} = \mathcal{L}_{symm} + \mathcal{L}_{nor} + \mathcal{L}_{Lap} \tag{Eq. 4}$$

$\mathcal{L}_{symm}$ is a symmetry loss, which is designed to minimize the Chamfer distance between the deformed point cloud and its reflection along the x-axis. Given the mesh connectivity, normal loss $\mathcal{L}_{nor}$ and Laplacian loss $\mathcal{L}_{Lap}$ are computed to prevent distortions. $\mathcal{L}_{nor}$ minimizes the angle difference between the face normals of the source mesh and the deformed mesh. $\mathcal{L}_{Lap}$ minimizes l1-norm of the difference of Cotangent Laplacian. Further, the difference between the Cotangent Laplacians of the source shape and the deformed shape (l1-norm) can be used to measure distortion. Compared to many conventional systems, the disclosed system achieves better Chamfer distance with a similar Cotangent Laplacian.

Referring back to the adversarial loss, various embodiments use both normal loss $\mathcal{L}_{nor}$ (part of the geometric loss $\mathcal{L}_{geo}$) and adversarial loss $\mathcal{L}_{adv}$ to encourage plausible deformations. When there is no $\mathcal{L}_{adv}$, the deformation may lose plausibility to match the target shape. Although $\mathcal{L}_{nor}$ can also alleviate this issue to some extent, strong $\mathcal{L}_{nor}$ becomes too restrictive for the deformation, while $\mathcal{L}_{adv}$ achieves more realistic results and still allows flexible deformations. Overall, $\mathcal{L}_{adv}$ help the system to generate diverse and realistic deformations. In some configurations, $\mathcal{L}_{adv}$ is provided by a 2D discriminator network, as discussed in further detail below with reference to FIG. 6.

Further, a disentanglement loss $\mathcal{L}_{disen}$ is used towards the third objective. In one embodiment, $\mathcal{L}_{disen}$ is defined with four terms, as in Eq. 5.

$$\mathcal{L}_{disen} = \mathcal{L}_{sp} + \mathcal{L}_{cov} + \mathcal{L}_{ortho} + \mathcal{L}_{SVD} \qquad \text{(Eq. 5)}$$

Specifically, $\mathcal{L}_{sp}$ encourages the meta-handles $M_i$ and the coefficient vector a to be sparse by penalizing their l1-norm. $\mathcal{L}_{cov}$ penalizes the covariance matrix (calculated for each batch) of the coefficients a. $\mathcal{L}_{ortho}$ encourages meta-handles to cover different parts of the control point offsets by penalizing "dot products" between the meta-handles. $\mathcal{L}_{SVD}$ encourages the control points to translate in a single direction within each meta-handle.

Further, regarding the coefficient ranges, $\mathcal{L}_{fit}$ motivates the coefficient ranges to expand to cover more plausible deformations. $\mathcal{L}_{geo}$ and $\mathcal{L}_{adv}$ prevent the ranges from excessive expansion by penalizing implausible deformations. In this way, the learned coefficient ranges become balanced.

Figure 4:
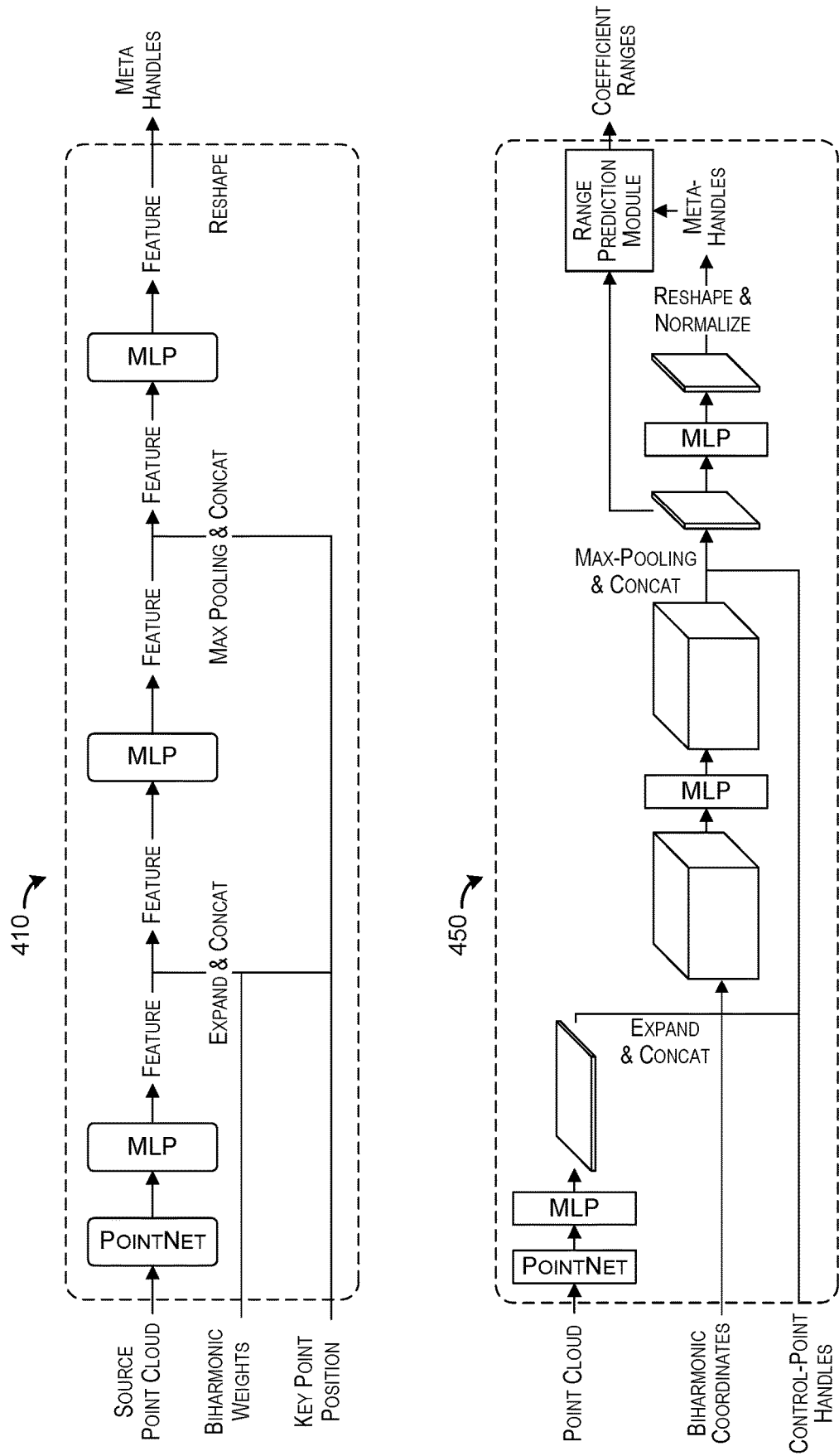
FIG. 4 is a schematic representation illustrating various aspects of an exemplary network that determines meta-handles and coefficient ranges, in accordance with at least one aspect of the technologies described herein.

FIG. 4 is a schematic representation illustrating various aspects of an exemplary network that determines meta-handles and coefficient ranges. Here, network 410 is configured to determine meta-handles, and network 450 is configured to determine coefficient ranges. At a high level, network 410 and network 450 incorporates the information from the shape (point cloud), control point handles, and biharmonic coordinates by building a 3D tensor and predicts a set of meta-handles with the corresponding coefficient ranges for the shape.

Deformation handles are used to parameterize smooth deformations with a low degree of freedom because not all the translations of the control points would lead to plausible deformations. Based on the control points, these networks learn a low-dimensional deformation subspace for each shape, and cause the structure of this subspace to be interpretable, e.g., with semantic means and could be visually represented in a GUI.

In this the architecture of network 410 and network 450, to ease encoding, the input source mesh is converted to a point cloud (denoted as $P \in \mathbb{R}^{p \times 3}$) by uniformly sampling p points over the mesh surface. The precomputed biharmonic coordinates are also interpolated from the mesh vertices to the point cloud (i.e., $W \in \mathbb{R}^{p \times c}$) according to the barycentric coordinates. The point cloud is encoded to obtain 64-dimensional features per point, which is denoted as $D \in \mathbb{R}^{p \times 64}$. Then, the point features D, the biharmonic coordinates W, and the rest positions of the control points $C_0 \in \mathbb{R}^{c \times 3}$ are consolidated in a 3D tensor. A tensor refers to a container that can house data in N dimensions (typically N≥3) and its linear operations.

In one embodiment, the 3D tensor has a size of p×c×68, and the first p×c×64 is packed with the point features D (repeating for the control points), the next p×c×1 is filled with the biharmonic coordinates W, and the last p×c×3 is filled with the rest positions of the control points $C_0$ (repeating for the point cloud). Hence, in this tensor, each pair of a point in P and a control point has a 68-dimensional feature, which is processed with an MLP, which is a class of feedforward artificial neural network (ANN). As previously introduced, an MLP consists of at least an input layer, a hidden layer, and an output layer. Except for the input nodes, each node in the MLP is a neuron that uses a nonlinear activation function. MLP typically utilizes a supervised learning technique called backpropagation for training.

The features across the points are then aggregated through a symmetric function (i.e., max-pooling) to produce 64-dimensional features per control point. The control point feature is combined again with the rest position of the control point and is then converted to a 3m-dimensional vector through another MLP, which becomes the offsets for the m meta-handles.

Then, each metal-handle is further normalized to unit length to facilitate training. The predicted meta-handles and the 67-dimensional control point features are then fed into a range prediction module, which outputs a coefficient range $[L_i, R_i]$ for each meta-handle.

Advantageously, network 410, and network 450 learn a set of disentangled interpretable meta-handles with the corresponding coefficient ranges, which factorize all the plausible deformations for the shape. It should be noted that network 410 and network 450 merely show a specific embodiment, and these networks can use different architectures in alternative embodiments.

Experiments show that although semantic annotation or correspondences across different shapes are not used as input or supervision, the disclosed deformation system is able to learn some intuitive meta-handles. Specifically, the learned meta-handles are not limited to global scaling. Many of them align with some local semantic parts, such as the thickness of the chair seat, the height of armrests, the length of four chair legs, and the height of the chair back. Also, many of them involve non-rigid deformation of some parts, such as bending the chair back and two back legs, which cannot be achieved through the rigid bounding-box handles proposed by conventional methods. Further, to construct a low-dimensional compact deformation space, the learned meta-handles not only leverage correlations between the control point handles, but also discover the underlying hard constraints (e.g., symmetry) of the shape structure. Meanwhile, the coefficient ranges learn the underlying soft priors (e.g., ratios of part scales) and provide reasonable deformation scope for each meta-handle. Further, learned meta-handles are consistent across different shapes. Despite geometry details and even global structures being different, each meta-handle can find corresponding regions across various shapes and predict similar deformations.

In alternative embodiments, instead of predicting a set of meta-handles, the disclosed deform system deforms a shape by directly predicting the offset of each control point handle in the deformation function $f$. However, this approach allows more degrees of freedom for the deformation, and it becomes harder for the network to find plausible deformations based on too many control point handles. In comparison, the approach to learn meta-handles provides intuitive deformations and results in better plausible deformations. Further, without meta-handles, the system cannot directly sample plausible variants of an input shape. Resultantly, the target-driven deformation is less effective in generating diverse deformations and covering all the plausible variants.

Figure 5:
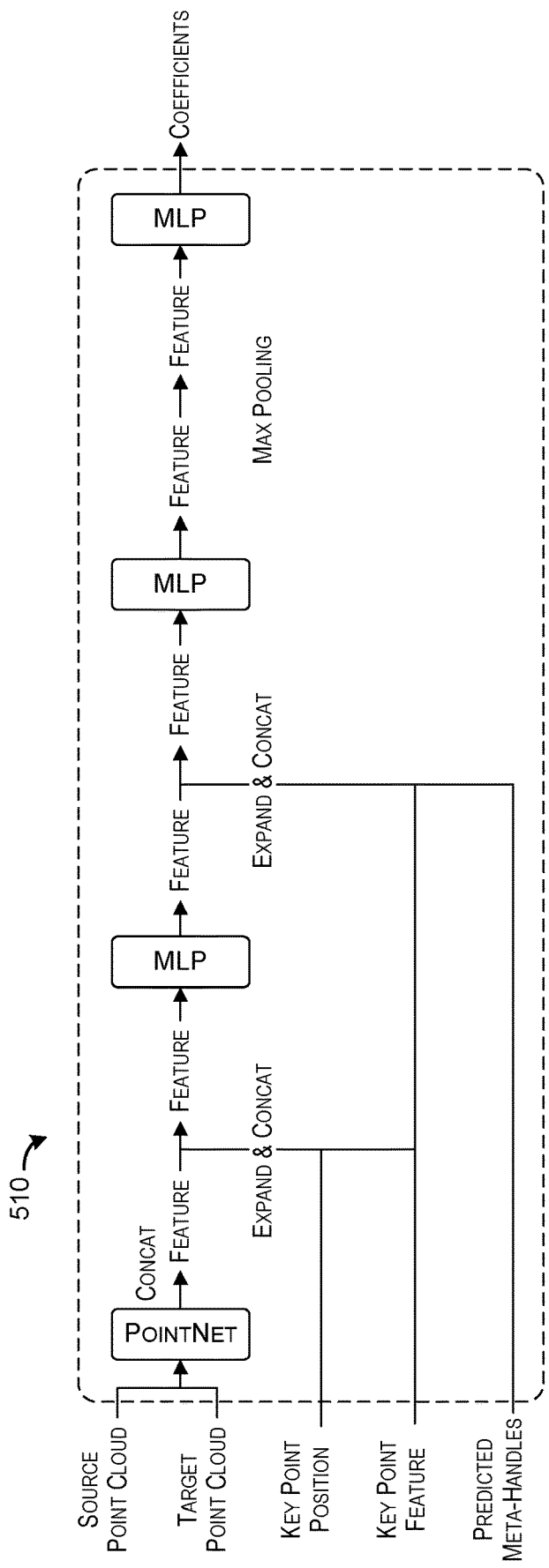
FIG. 5 is a schematic representation illustrating various aspects of an exemplary network that determines coefficients, in accordance with at least one aspect of the technologies described herein.

FIG. 5 is a schematic representation illustrating various aspects of an exemplary network that determines coefficients. This deformation-based conditional generative model takes random pairs of source and target shapes as input during training. For example, taking a pair of randomly sampled shapes within the same category as input, the deform system predicts a deformation space for the source shape and finds a deformation within the space to match the target shape.

Referring back to FIG. 4, the meta-handle net uses source shape, control points, and biharmonic coordinates to predict meta-handles with network 410 and corresponding coefficient ranges with network 450. Here, FIG. 5 shows the architecture of network 510, which may be used by the deformation net to predict coefficients multiplied to the meta-handles within the coefficient ranges so that the source shape deformed with the coefficients can match the target shape. In a specific embodiment, network 450 predicts a range of coefficients, and network 510 predicts a "normalized" coefficient. For instance, when network 450 predicts the range of $[L_i, R_i]$ and network 510 predicts a normalized coefficient "x," the final coefficient becomes $[(R_i-L_i)x+L_i]$. Advantageously, network 450 and network 510 can be used to predict the best "normalize" coefficient that matches the target shape during the training time while guaranteeing that the final coefficient is always in the predicted coefficient range. Further, the same networks can generate arbitrary but plausible shapes by taking any coefficient in the range during the inference time.

Specifically, in this embodiment, network 510 takes source shape, control points, meta-handles with the coefficient ranges, and the control point features (e.g., extracted by meta-handle net 320 in FIG. 3 or network 410 in FIG. 4) as input and predicts a coefficient vector a $E \in \mathbb{R}^m$ within the predicted ranges $\Pi_{i=1}^m [Li, Ri]$. The predicted coefficient vector and the meta-handles are then fed into the deformation function g (Eq. 2) to decode the deformation for the source shape, which is expected to match the target shape. Further, similar to network 410 or network 450, network 510 also builds a 3D tensor to incorporate all the information and utilize shared-weight MLPs and max-pooling to process and aggregate the features.

Figure 6:
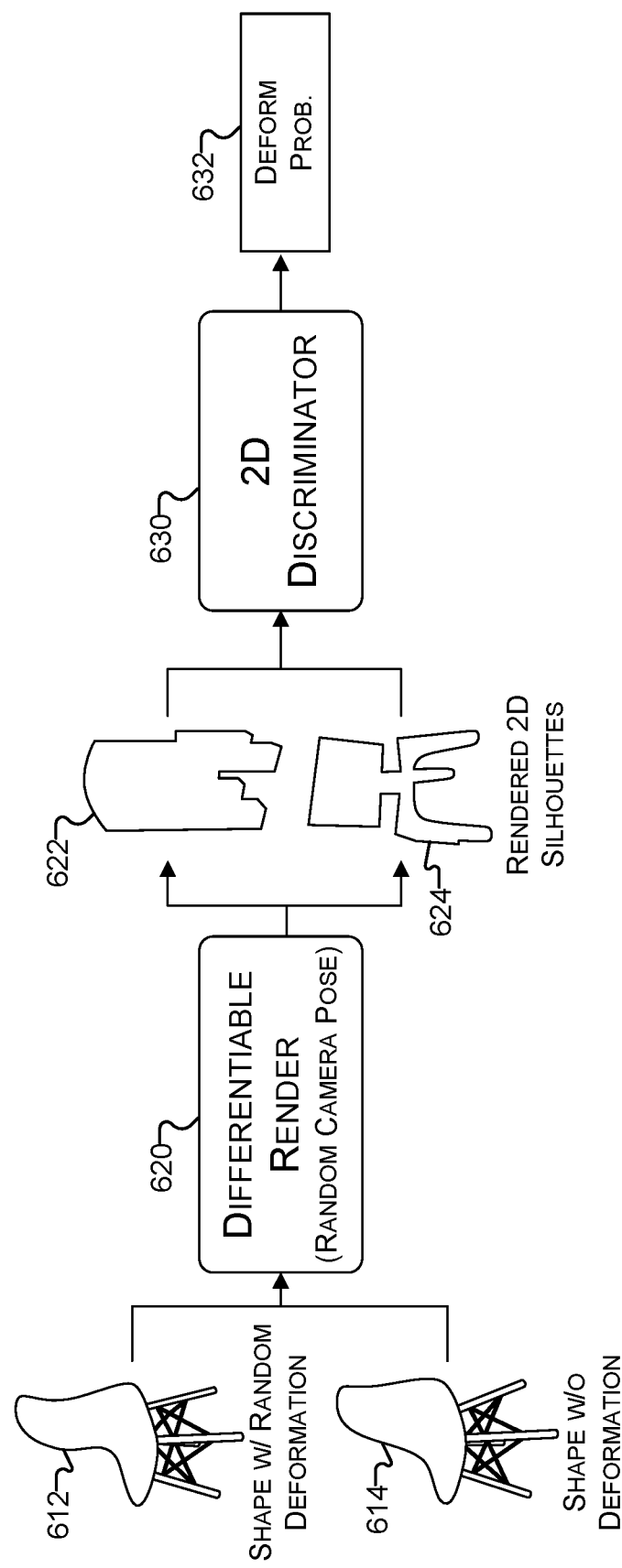
FIG. 6 is a schematic representation illustrating various aspects related to a discriminator network in an exemplary system, in accordance with at least one aspect of the technologies described herein.

FIG. 6 is a schematic representation illustrating various aspects related to a discriminator net in an exemplary deform system. In some embodiments, besides applying geometric regularization to improve the plausibility of deformation, the disclosed deform system further leverage a soft rasterizer and a 2D discriminator network to generate the adversarial regularization $\mathcal{L}_{adv}$, which is further discussed in connection with FIG. 8.

As shown in this embodiment, shape 612 is a randomly deformed shape (i.e., shape 612 is a shape with a random deformation applied to the shape 614), and shape 614 is a shape without deformation. Both shape 612 and shape 614 are fed into render 620, e.g., a soft rasterizer. Render 620 captures image 622 and image 624, which are soft silhouette images for respective shapes from a randomly sampled view. Image 622 and image 624 are then fed into discriminator 630, which is a 2D discriminator with a 2D convolution neural network to predict whether they come from a deformed shape or not.

This 2D discriminator net is jointly trained with meta-handle net and deformation net with a classification loss function. The output probabilities for the deformed shapes are used to penalize implausible or unrealistic deformations.

Figure 7:
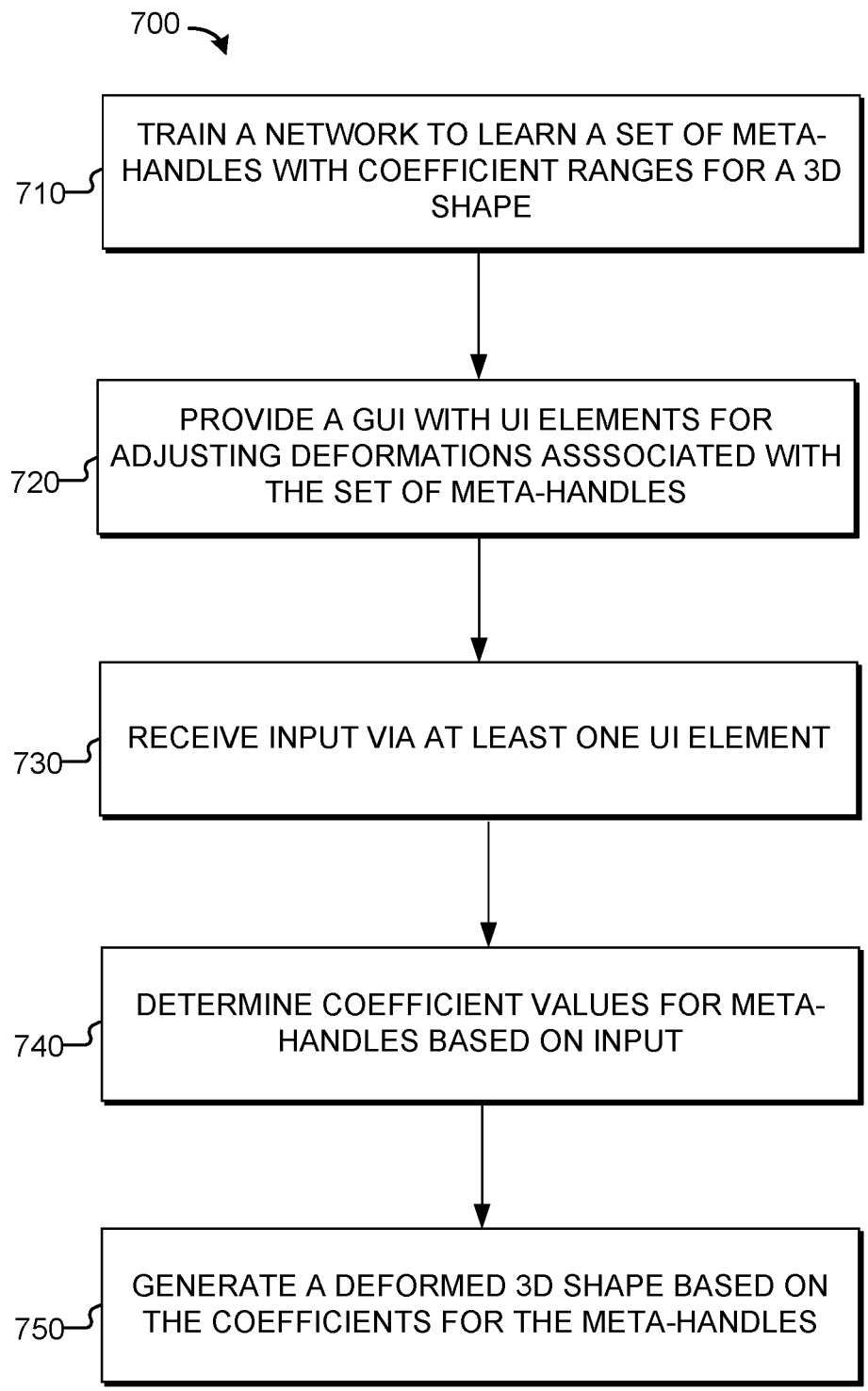
FIG. 7 is a flow diagram illustrating an exemplary process of deformation with meta-handles, in accordance with at least one aspect of the technologies described herein.

FIG. 7 is a flow diagram illustrating an exemplary process 700 of deformation with meta-handles, e.g., performed by system 100 of FIG. 1. Each block of process 700, and other processes described herein, comprises a computing process that may be performed using any combination of hardware, firmware, or software. For instance, various functions may be carried out by a processor executing instructions stored in memory. The process may also be embodied as computer-usable instructions stored on computer storage media or devices. The process may be executed by a device, a standalone application or app, a computing service, or in any combinations thereof.

At a high level, a 3D conditional generative model based on mesh deformation is disclosed herein. The process takes automatically-generated control points with biharmonic coordinates as deformation handles and learns a latent space of deformation for each input mesh. Each axis of the space is explicitly associated with multiple deformation handles. The disentangled meta-handles factorize all the plausible deformations of the shape, while each of them conforms to an intuitive deformation. The process learns the meta-handles unsupervised by incorporating a target-driven deformation module. The process also employs a differentiable render and a 2D discriminator to enhance the plausibility of the deformation.

As shown at block 710, given a 3D shape, a network is trained to learn a set of meta-handles and a coefficient range for each meta-handle. The meta-handles and coefficient range may be learned based on controls points on the 3D shape and their biharmonic coordinates. At block 720, a graphical user interface is provided for deforming the 3D shape based on the meta-handles. The graphical user interface may include user interface elements for adjusting the deformation applied to the 3D shape based on the meta-handles. For instance, a slider could be provided on the graphical user interface for each meta-handle, allowing a user to adjust a slider and deform the 3D shape along the deformation direction of an associated meta-handle. As shown at block 730, input is received via at least one user interface element. Coefficients values for the meta-handles are determined based at least in part on the input, as shown at block 740. For instance, the user input may be translated to one or more coefficients for the meta-handles. The coefficient values may be represented for instance as a coefficient vector. At block 750, the process generates a deformed 3D shape from the input 3D shape based the coefficient values, e.g., via the deformation function g: $\mathbb{R}^m \to \mathbb{R}^{n \times 3}$ as defined in Eq. 2.

Further, the process may include assigning a deformation function to the meta-handle. The deformation function is based on a set of control points and respective biharmonic coordinates associated with the set of control points. The deformation function connects the meta-handle to a deformation direction that can be represented in a GUI, e.g., by a graphic element. In various embodiments, the deformation direction associated with the meta-handle is represented by a directional graphical element (e.g., an arrow) in the GUI. The process may further include deforming the source shape in the deformation direction based on the deformation function.

Further, the process estimates the coefficient range for the meta-handle based on soft priors learned from a neural network. The soft priors include ratios of part scales. Furthermore, the process predicts the meta-handle based on one or more hard constraints (e.g., the symmetry of a shape structure of the source shape) learned from a neural network.

Figure 8:
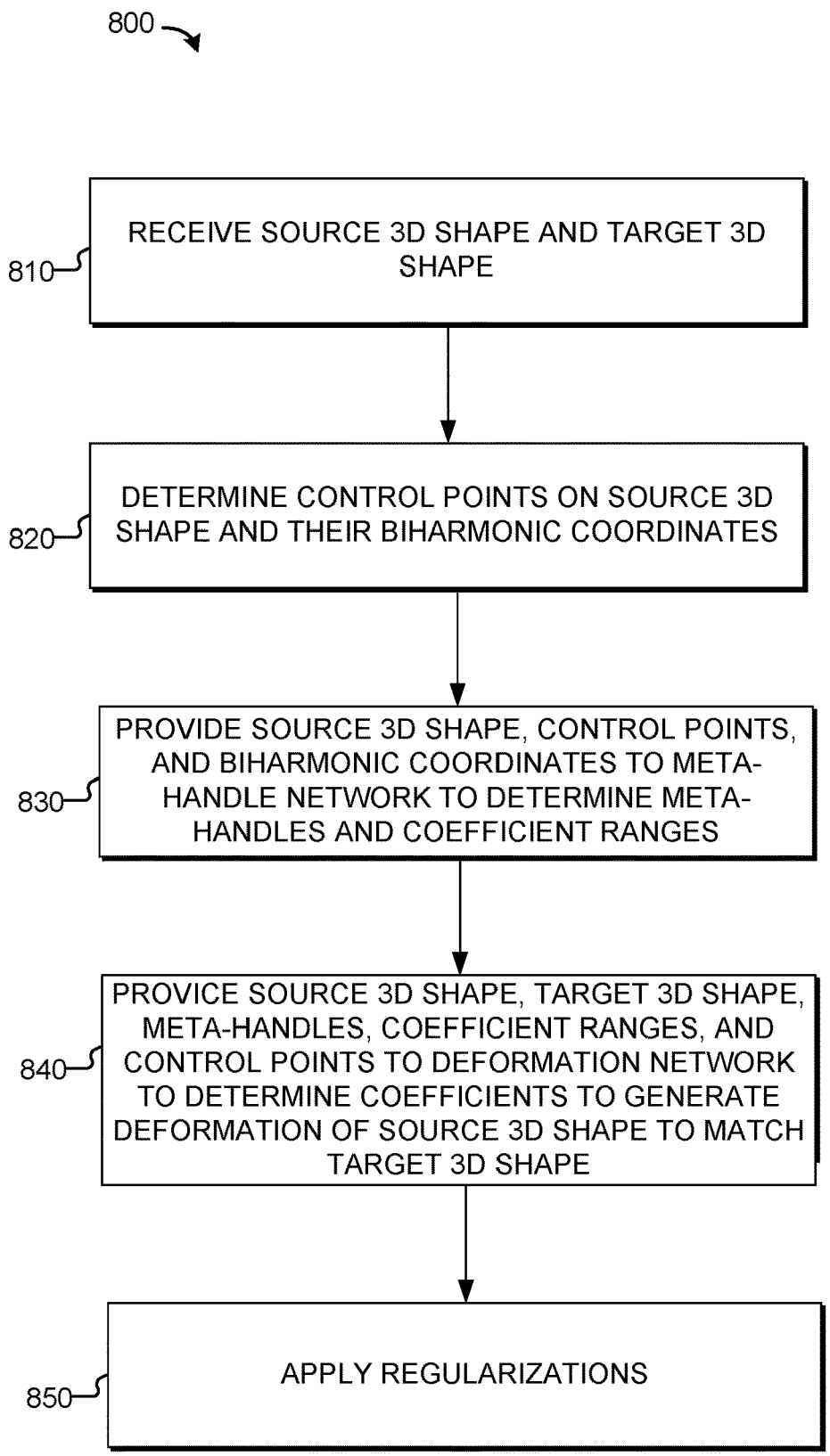
FIG. 8 is a flow diagram illustrating an exemplary process of training an exemplary system, in accordance with at least one aspect of the technologies described herein.

FIG. 8 is a flow diagram illustrating an exemplary process 800 of training an exemplary system. As shown at block 810, a source 3D shape and target 3D shape are received. The 3D shapes may be, for instance, sampled from a collection of 3D shapes within a given category. Control points on the source 3D shape and their biharmonic coordinates are determined, as shown at block 820. In one embodiment, the control points are sampled from the mesh vertices of the source 3D shape by farthest point sampling over the geodesic distances, and respective biharmonic coordinates for the control points are computed. The source 3D shape, control points, and biharmonic coordinates are provided as input to a meta-handle network, which determines meta-handles for the source 3D shape and a range of coefficients for each meta-handle, as shown at block 830. The source 3D shape, target 3D shape, meta-handles, coefficient ranges, and control points are provided as input to a deformation network, which determines coefficient values for the meta-handles that produce a deformation of the source 3D shape to match the target 3D shape, as shown at block 840. Additionally, as shown at block 850, regularizations are applied to help train the overall network. As discussed previously, the regularizations may include a fitting loss, a geometric loss, an adversarial loss, and a disentangle loss. The fitting loss operates to minimize a Chamfer distance between the deformation of the source 3D shape from the deformation network and the target 3D shape. The geometric loss and adversarial loss each penalize implausible deformations using randomly sampled deformations of the source 3D shape generated using coefficient values within the coefficient ranges. The adversarial loss may be provided by a 2D discriminator network that is jointly trained with the meta-handle network and the deformation network. The disentanglement loss causes the set of meta-handles to disentangle a deformation space.

Results in experiments show that conventional deformation systems fail to preserve fine-grained details of the source shape and introduce lots of distortions. In contrast, the disclosed system allows flexible deformation and fine-grained detail preservation. As an example, the disclosed system can achieve more detailed deformation of a local region, such as adjusting the thickness of chair seats and armrests' height.

Further, the resulting deformations are also more plausible, especially when the source-target pairs do not share the same structures. By way of example, most conventional systems produce unrealistic deformations when the source shape and the target shape do not share similar structures. For example, suppose the source shape has four chair legs, and the target shape is a swivel chair. In that case, conventional systems tend to deform the four chair legs toward the center under the fitting loss's influence, resulting in undesirable deformations. However, the adversarial regularization as employed in the disclosed system can avoid such implausible deformations while still aligning the output to the target.

Accordingly, various aspects of the technologies have been disclosed herein. It is understood that various features, sub-combinations, and modifications of the embodiments described herein are of utility and may be employed in other embodiments without reference to other features or sub-combinations. Moreover, the order and sequences of steps/blocks shown in the above example processes are not meant to limit the scope of the present disclosure in any way, and in fact, the steps/blocks may occur in a variety of different sequences within embodiments hereof. Such variations and combinations thereof are also contemplated to be within the scope of embodiments of this disclosure.

Figure 9:
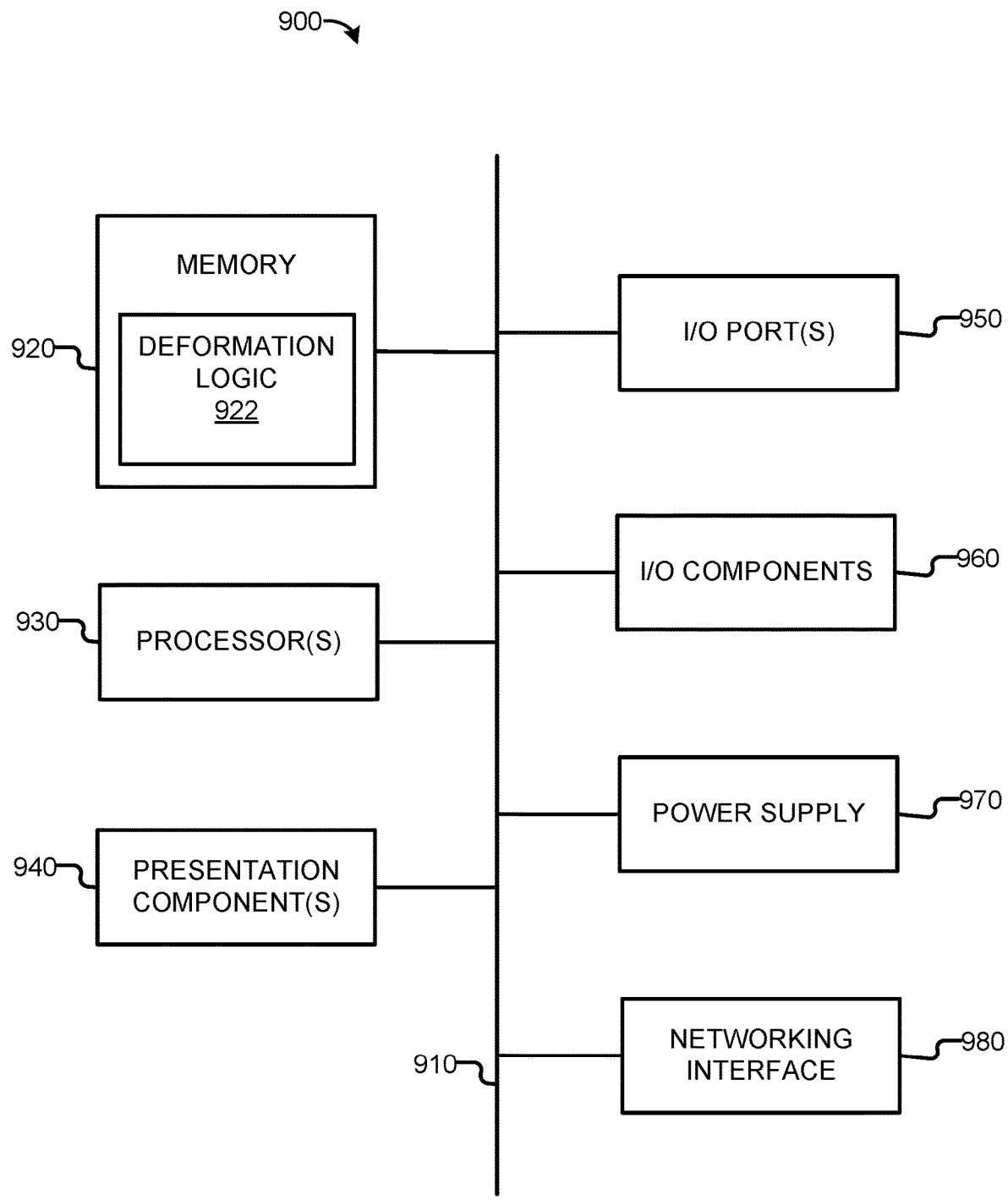
FIG. 9 is a block diagram of an exemplary computing environment suitable for implementing various aspects of the technologies described herein.

Referring to FIG. 9, an exemplary operating environment for implementing various aspects of the technologies described herein is shown and designated generally as computing device 900. Computing device 900 is but one example of a suitable computing environment and is not intended to suggest any limitation as to the scope of use of the technologies described herein. Neither should the computing device 900 be interpreted as having any dependency or requirement relating to any one or combination of components illustrated.

The technologies described herein may be described in the general context of computer code or machine-useable instructions, including computer-executable instructions such as program components being executed by a computer or other machine. Generally, program components, including routines, programs, objects, components, data structures, and the like, refer to code that performs particular tasks or implements particular abstract data types. The technologies described herein may be practiced in a variety of system configurations, including handheld devices, consumer electronics, general-purpose computers, and specialty computing devices, etc. Aspects of the technologies described herein may also be practiced in distributed computing environments where tasks are performed by remote processing devices that are connected through a communications network.

With continued reference to FIG. 9, computing device 900 includes a bus 910 that directly or indirectly couples the following devices: memory 920, processors 930, presentation components 940, input/output (I/O) ports 950, I/O components 960, and an illustrative power supply 970. Bus 910 may include an address bus, data bus, or a combination thereof. Although the various blocks of FIG. 9 are shown with lines for the sake of clarity, delineating various components is not so clear in various embodiments, and metaphorically, the lines would more accurately be grey and fuzzy. For example, one may consider a presentation component such as a display device to be an I/O component. The inventors hereof recognize that such is the nature of the art and reiterate that the diagram of FIG. 9 is merely illustrative of an exemplary computing device that can be used in connection with different aspects of the technologies described herein. The distinction is not made between such categories as "workstation," "server," "laptop," "handheld device," etc., as all are contemplated within the scope of FIG. 9 and refers to "computer" or "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technologies for storage of information such as computer-readable instructions, data structures, program modules, or other data.

Computer storage media includes RAM, ROM, EEPROM, flash memory or other memory technologies, CD-ROM, digital versatile disks (DVD) or other optical disk storage, magnetic cassettes, magnetic tape, magnetic disk storage, or other magnetic storage devices. Computer storage media does not comprise a propagated data signal. A computer-readable device or a non-transitory medium in a claim herein excludes transitory signals.

Communication media typically embodies computer-readable instructions, data structures, program modules, or other data in a modulated data signal such as a carrier wave or other transport mechanism and includes any information delivery media. The term "modulated data signal" means a signal that has its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 920 includes computer storage media in the form of volatile and/or nonvolatile memory. The memory 920 may be removable, non-removable, or a combination thereof. Exemplary memory includes solid-state memory, hard drives, optical-disc drives, etc. Computing device 900 includes processors 930 that read data from various entities such as bus 910, memory 920, or I/O components 960. Presentation component(s) 940 present data indications to a user or another device. Exemplary presentation components 940 include a display device, speaker, printing component, vibrating component, etc. I/O ports 950 allow computing device 900 to be logically coupled to other devices, including I/O components 960, some of which may be built-in.

In various embodiments, memory 920 includes, in particular, temporal and persistent copies of deformation logic 922. Deformation logic 922 includes instructions that, when executed by processor 930, result in computing device 900 performing functions, such as but not limited to, process 700 or process 800, or other processes described herein. In various embodiments, deformation logic 922 includes instructions that, when executed by processors 930, result in computing device 900 performing various functions associated with, but not limited to various components in connection with system 100 in FIG. 1, including presenter 110, UI manager 120, rendering engine 130, meta-handler 140, deformer 150, discriminator 160, etc.

Illustrative I/O components include a microphone, joystick, gamepad, satellite dish, scanner, printer, display device, wireless device, a controller (such as a stylus, a keyboard, and a mouse), a natural user interface (NUI), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 930 may be direct or via a coupling utilizing a serial port, parallel port, system bus, or other interface known in the art. Furthermore, the digitizer input component may be a component separate from an output component, such as a display device. In some aspects, the usable input area of a digitizer may coexist with the display area of a display device, be integrated with the display device, or may exist as a separate device overlaying or otherwise appended to a display device. Any and all such variations, and any combination thereof, are contemplated to be within the scope of aspects of the technologies described herein.

I/O components 960 include various GUIs, which allow users to interact with computing device 900 through graphical elements or visual indicators, such as various graphical elements illustrated in FIG. 2. Interactions with a GUI are usually performed through direct manipulation of graphical elements in the GUI. Generally, such user interactions may invoke the business logic associated with respective graphical elements in the GUI. Two similar graphical elements may be associated with different functions, while two different graphical elements may be associated with similar functions. Further, the same GUI may have different presentations on different computing devices, such as based on the different graphical processing units (GPUs) or the various characteristics of the display.

Computing device 900 may include networking interface 980. The networking interface 980 includes a network interface controller (NIC) that transmits and receives data. The networking interface 980 may use wired technologies (e.g., coaxial cable, twisted pair, optical fiber, etc.) or wireless technologies (e.g., terrestrial microwave, communications satellites, cellular, radio, and spread spectrum technologies, etc.). Particularly, the networking interface 980 may include a wireless terminal adapted to receive communications and media over various wireless networks. Computing device 900 may communicate with other devices via the networking interface 980 using radio communication technologies. The radio communications may be a short-range connection, a long-range connection, or a combination of both a short-range and a long-range wireless telecommunications connection. A short-range connection may include a Wi-Fi® connection to a device (e.g., mobile hotspot) that provides access to a wireless communications network, such as a wireless local area network (WLAN) connection using the 802.11 protocol. A Bluetooth connection to another computing device is a second example of a short-range connection. A long-range connection may include a connection using various wireless networks, including 1G, 2G, 3G, 4G, 5G, etc., or based on various standards or protocols, including General Packet Radio Service (GPRS), Enhanced Data rates for GSM Evolution (EDGE), Global System for Mobiles (GSM), Code Division Multiple Access (CDMA), Time Division Multiple Access (TDMA), Long-Term Evolution (LTE), 802.16 standards, etc.

The technologies described herein have been described in relation to particular aspects, which are intended in all respects to be illustrative rather than restrictive. While the technologies described herein are susceptible to various modifications and alternative constructions, certain illustrated aspects thereof are shown in the drawings and have been described above in detail. It should be understood, however, that there is no intention to limit the technologies described herein to the specific forms disclosed, but on the contrary, the intention is to cover all modifications, alternative constructions, and equivalents falling within the spirit and scope of the technologies described herein.

What is claimed is:

1. One or more computer storage media storing computer-useable instructions that, when used by one or more processors, cause the one or more processors to perform operations comprising:
    receiving a source three-dimensional (3D) shape and a target 3D shape;
    determining control points on the 3D shape and biharmonic coordinates for the control points; and
    training a network to learn a set of meta-handles for the source 3D shape and a coefficient range for each meta-handle, each meta-handle corresponding to a combination of control-point offsets, the network including:
        a meta-handle network that determines the set of meta-handles and coefficient ranges based on the source 3D shape, the control points, and the biharmonic coordinates; and
        a deformation network that determines coefficient values for the meta-handles that generate a resulting deformation of the source 3D shape to match the target 3D shape.

2. The one or more computer storage media of claim 1, wherein the network is trained using a fitting loss to cause the resulting deformation of the source 3D shape to match the target 3D shape by minimizing a Chamfer distance between a first point cloud of the resulting deformation of the source 3D shape and a second point cloud of the target 3D shape.

3. The one or more computer storage media of claim 1, wherein the network is trained using a geometric loss to penalize implausible deformations using a randomly sampled deformation of the source 3D shape generated using coefficient values within the coefficient ranges.

4. The one or more computer storage media of claim 3, wherein the geometric loss comprises: a symmetry loss minimizing a Chamfer distance between the randomly sampled deformation of the source 3D shape and its reflection along an axis; a normal loss minimizing an angle difference between face normals of the randomly sampled deformation of the source 3D shape and the source 3D shape; and/or a Laplacian loss minimizing l1-norm of difference of Cotangent Laplacian.

5. The one or more computer storage media of claim 1, wherein the network is trained using an adversarial loss to penalize implausible deformations using a randomly sampled deformation of the source 3D shape generated using coefficient values within the coefficient ranges.

6. The one or more computer storage media of claim 5, wherein the adversarial loss comprises generating respective two-dimensional (2D) silhouette images for the randomly sampled deformation of the source 3D shape and the source 3D shape; and employing a 2D discriminator network to determine a probability of the respective 2D silhouette images for being deformed, wherein the deformation network is further configured to penalize implausible deformations based on the determined probability.

7. The one or more computer storage media of claim 1, wherein the network is trained using a disentanglement loss to cause the set of meta-handles to disentangle a deformation space.

8. The one or more computer storage media of claim 7, wherein the disentanglement loss comprises: a first loss component encouraging the set of meta-handles to be sparse by penalizing their l1-norm; a second loss component penalizing a covariance matrix of the coefficient values determined by the deformation network: a third loss component encouraging the set of meta-handles to cover different parts of the control-point offsets by penalizing dot products between the meta-handles; and/or a fourth loss component encouraging the control points to translate in a single direction within each meta-handle.

9. The one or more computer storage media of claim 1, wherein the control points on the source 3D shape sampled from mesh vertices of the source 3D shape based on a farthest point sampling method.

10. The one or more computer storage media of claim 1, wherein the operations further comprise:
providing a graphical user interface for generating a deformed 3D shape based on the source 3D shape;
receiving, via the graphical user interface, an indication of a deformation degree associated with at least a portion of the set of meta-handles;
determining at least one coefficient value for the set of meta-handles based on the deformation degree; and
generating the deformed 3D shape based at least in part on the determined at least coefficient value for the set of meta-handles.

11. The one or more computer storage media of claim 1, wherein the deformed 3D shape is generated by feeding the set of meta-handles and a coefficient vector comprising the determined coefficient value to a deformation function to decode a deformation of the source 3D shape to provide the deformed 3D shape.

12. A computer-implemented method, comprising:
training a model to learn a set of meta-handles for a three-dimensional (3D) shape and a coefficient range for each meta-handle based on control points on the 3D shape and biharmonic coordinates of the control points, each meta-handle corresponding to a combination of control-point offsets;
receiving, via a graphical user interface, an indication of a deformation degree associated with at least a portion of the set of meta-handles;
determining at least one coefficient value for the set of meta-handles based on the deformation degree; and
generating a deformed shape from the 3D shape based at least in part on the determined at least one coefficient value for the set of meta-handles.

13. The computer-implemented method of claim 12, wherein training the model to learn the set of meta-handles and the coefficient ranges comprises:
receiving the 3D shape and a target 3D shape;
determining control points on the 3D shape and biharmonic coordinates for the controls points; and
jointly training a first network of the model and a second network of the model, the first network determining the set of meta-handles and the coefficient ranges based on the 3D shape, the control points, and the biharmonic coordinates, and the second network determining coefficient values for the set of meta-handles within the coefficient ranges that generate a deformation of the 3D shape to match the target 3D shape.

14. The computer-implemented method of claim 13, wherein the model is trained using at least one regularization selected from the following: a fitting loss, a geometric loss, an adversarial loss, and a disentanglement loss.

15. The computer-implemented method of claim 14, wherein the fitting loss causes the deformation of the 3D shape to match the target 3D shape by minimizing a Chamfer distance between a first point cloud of the deformation of the 3D shape and a second point cloud of the target 3D shape.

16. The computer-implement method of claim 14, wherein the geometric loss penalizes implausible deformations using a randomly sampled deformation of the 3D shape generated using coefficient values within the coefficient ranges, the geometric loss comprising: a symmetry loss minimizing a Chamfer distance between the randomly sampled deformation of the source 3D shape and its reflection along an axis; a normal loss minimizing an angle difference between face normals of the randomly sampled deformation of the source 3D shape and the source 3D shape; and/or a Laplacian loss minimizing l1-norm of difference of Cotangent Laplacian.

17. The computer-implemented method of claim 14, wherein the network is trained using an adversarial loss to penalize implausible deformations using a randomly sampled deformation of the 3D shape generated using coefficient values within the coefficient ranges, wherein the adversarial loss comprises generating respective two-dimensional (2D) silhouette images for the randomly sampled deformation of the source 3D shape and the source 3D shape; and employing a 2D discriminator network to determine a probability of the respective 2D silhouette images for being deformed, wherein the deformation network is further configured to penalize implausible deformations based on the determined probability.

18. The computer-implemented method of claim 14, wherein the disentanglement loss causes the set of meta-handles to disentangle a deformation space, the disentanglement loss comprising: a first loss component encouraging the set of meta-handles to be sparse by penalizing their l1-norm; a second loss component penalizing a covariance matrix of the coefficient values determined by the deformation network: a third loss component encouraging the set of meta-handles to cover different parts of the control-point offsets by penalizing dot products between the meta-handles; and/or a fourth loss component encouraging the control points to translate in a single direction within each meta-handle.

19. A computer system comprising:
one or more processors; and
one or more computer storage media storing computer-useable instructions that, when used by the one or more processors, cause the computer system to perform operations comprising:
receiving a source three-dimensional (3D) shape and a target 3D shape;
determining control points on the source 3D shape and biharmonic coordinates for the control points; and
training a model for deforming the source 3D shape by:
providing the source 3D shape, control points, and biharmonic coordinates to a first network to train the first network to determine a set of meta-handles for the source 3D shape and coefficient ranges for the meta-handles, each meta-handle corresponding to a combination of control-point offsets;
providing the source 3D shape, the target 3D shape, the set of meta-handles, and the coefficient ranges to a second network to train the second network to determine coefficient values to generate a deformation of the source 3D shape to match the target 3D shape; and
applying one or more regularizations.

20. The computer system of claim 19, wherein the one or more regularizations comprise a fitting loss, a geometric loss, an adversarial loss, and a disentanglement loss.

* * * * *

UNITED STATES PATENT AND TRADEMARK OFFICE
CERTIFICATE OF CORRECTION

PATENT NO. : 11,488,356 B2
APPLICATION NO. : 17/195099
DATED : November 1, 2022
INVENTOR(S) : Radomir Mech, Minhyuk Sung and Minghua Liu It is certified that error appears in the above-identified patent and that said Letters Patent is hereby corrected as shown below:

In the Claims

Claim 15, Column 20, Line 43:
In the line reading "16. The computer-implement method of claim 14," should read --16. The computer-implemented method of claim 14,--.

Signed and Sealed this
Fourteenth Day of March, 2023

Katherine Kelly Vidal
Director of the United States Patent and Trademark Office